(12) United States Patent
Page

(10) Patent No.: US 6,805,804 B2
(45) Date of Patent: Oct. 19, 2004

(54) CONTINUOUS ROLL BASIN INSERT

(76) Inventor: Ardle E. Page, 1455 Center St., Albany, OR (US) 97321

( * ) Notice: Subject to any disclaimer, the term of this patent is extended or adjusted under 35 U.S.C. 154(b) by 0 days.

(21) Appl. No.: 10/127,646

(22) Filed: Apr. 22, 2002

(65) Prior Publication Data

US 2004/0040901 A1 Mar. 4, 2004

(51) Int. Cl.[7] .................................................. E03F 5/06
(52) U.S. Cl. ....................... 210/747; 210/767; 210/164; 210/170; 210/434; 210/474; 404/4
(58) Field of Search ................................. 210/163, 164, 210/170, 434, 433.1, 474, 477, 485, 499, 747, 767; 404/4, 5

(56) References Cited

U.S. PATENT DOCUMENTS

| 1,041,887 A | * | 10/1912 | Schodde ..................... 210/163 |
| 1,746,121 A | | 2/1930 | Levi |
| 2,102,310 A | | 12/1937 | Egan |
| 2,615,526 A | | 10/1952 | Lane |
| 4,419,232 A | | 12/1983 | Arntyr et al. |
| 5,405,539 A | * | 4/1995 | Schneider ..................... 210/163 |
| 5,575,925 A | | 11/1996 | Logue, Jr. |
| 6,004,457 A | * | 12/1999 | Singleton ..................... 210/163 |
| 6,045,691 A | | 4/2000 | McDermott |
| 6,294,095 B1 | * | 9/2001 | Lewis ......................... 210/164 |
| 6,306,293 B1 | * | 10/2001 | Schilling et al. ............... 404/4 |

OTHER PUBLICATIONS

Application #09/769,212 filing date Jan. 25, 2001 GRP Art Unit 1724 Catch Basin Filter John F. Harris & Ardle E. Page.
Application #09/991,733 Subgrate Basin Filter by Ardle E. Page.

* cited by examiner

Primary Examiner—Christopher Upton
(74) Attorney, Agent, or Firm—Robert K. Lau

(57) ABSTRACT

The invention is a basin insert, for use with a storm water drain basin having a perforated cover and cover support ledges. The invention comprises a filter bag assembly having a filter bag, support means to suspend the assembly within the drain basin, and overflow bypasses. The filter bag is formed from a continuous roll of filtering material.

23 Claims, 2 Drawing Sheets

CONTINUOUS ROLL BASIN INSERT

CROSS-REFERENCE TO RELATED APPLICATIONS

Not applicable

STATEMENT REGARDING FEDERALLY SPONSORED RESEARCH

Not applicable

SEQUENCE LISTING

Not applicable

BACKGROUND OF THE INVENTION

1. Field of Invention

This invention pertains to an insert for use in a storm water basin to filter debris and pollutants from storm water run-off. Storm water collection systems are located throughout our city streets and parking lots providing flood control and drainage. The storm water needs to be as free as possible from pollutants before it enters our natural water systems.

To ensure that our water sources are protected, our handling of storm water is becoming more regulated. In order to meet these concerns, many inventions have been patented that provide an anti-pollution insert for catch basins and manholes. Most of these inventions are unnecessarily expensive complex, and sometimes ineffective.

2. Description of Prior Art

Caldwell (U.S. Pat. No. 1,310,055) discloses a storm water device to strain out large debris such as sticks and leaves allowing them to be broken up before passing down stream or be removed manually. This apparatus is ineffective in separating sand or small particulate such as cigarette filters from the storm water before flowing downstream from the opening.

A. Levy (U.S. Pat. No. 1,746,121) and George F. Egan (U.S. Pat. No. 2,102,310) show a receptacle for mounting below a storm water inlet. The large basket is constructed of metal. It is heavy and very complex. This would be very expensive to manufacture. They both require large equipment to install, and maintain.

F. Lane (U.S. Pat. No. 2,615,526) shows a basket mounted entirely below a catch basin grate. It comprises a rigid metal frame for the basket, which is suspended from rods secured directly to the bottom of the grate. This would be very time consuming and awkward to install. A grate is already heavy and hard to handle. The frame when attached to the grate would be difficult to install without damaging the metal frame. Furthermore, its complexity makes it expensive to manufacture.

Oscar S. Amtyr et al. (U.S. Pat. No. 4,419,232) shows a double basket mounted entirely beneath a storm drain opening with grate. The device is unnecessarily complex. The initial top screen basket is unnecessary. It removes pollutants that would have been removed by the below second filter anyway. The second stage basket cannot be serviced or emptied by hand unless the whole frame is removed. The ridged frame cannot be easily adapted to the various sizes of grates or accommodate typical angular distortions. The frame with its descending circumference is unnecessarily complex and expensive to manufacture. There is no provision for a bypass to accommodate high flows or filter failure.

Logue, Jr. (U.S. Pat. No. 5,575,925) and John F. Harris et al. (U.S. patent application Ser. No. 09/769,212 Group Art unit 1724) shows a basket essentially below the grate of a drain opening. A substantial amount of the apparatus extends above the grate. This can be a traffic hazard, and the apparatus would be vulnerable to wear and vandalism. Furthermore, the devices shown in Logue and Harris do not provide an overflow bypass. Accordingly, during high storm water flows and filter failure these systems would cause water to back up onto the street.

Holly S McDermott (U.S. Pat. No. 6,045,691) shows a receptacle entirely below a storm water inlet with a perforated cover. The receptacle however is limited in pollutant storage capacity. There are four separate baskets, one on each corner, which makes it time consuming to service. They need to be manually emptied since they are too small for being serviced by a typical large street-vacuuming machine. The fixed frame mounting does not easily adjust to the various distorted angles encountered in many rectangular storm water inlet openings at the installation sites. The drain basins are often out of square or of slightly different measurements than anticipated. The frame is unnecessarily expensive to manufacture. The pollutant sock is small in size and would quickly saturate.

Page (U.S. Pat. No. 6,666,974), shows a basin insert mounted bellow a catch basin comprising four separate rigid members for mounting on the catch basin grate ledges. This invention is dependent upon a metal bridge, which is placed over the bypass opening adding unnecessarily expense to the cost of manufacturing. The basin insert is supported on only two of the four sides. The horizontal bypass tends to allow large objects to float overtop of the bypass and into the basin below. The bag needs to be positioned a distance away from the flat walls of the basin sides in order to provide adequate room for the water to pass between the basket and the basin walls.

Accordingly, there is a need for a basin insert which is inexpensive to manufacture, easy to install, remove, service and can be cut to size on the job site.

BRIEF SUMMARY OF INVENTION

Referring to FIG. 1, the invention is a basin insert, for use with a storm water drain basin having a perforated cover and cover support ledges, comprising: a filter bag assembly having a filter bag, support sleeves, overflow bypasses located at the corners of the filter bag, which in turn are placed in the corners of the inlet drain basin, and support members, which are inserted through the support sleeves. The filter bag assembly is formed form a continuous roll of filtering material. Cutting a section from continuous roll of filtering material and then lying bottom forms the filter bag assembly.

Another embodiment of the invention is a method to filter storm water run-off entering a drain basin using a continuous roll of filtering material.

DETAILED DESCRIPTION OF THE INVENTION

Figure 1:
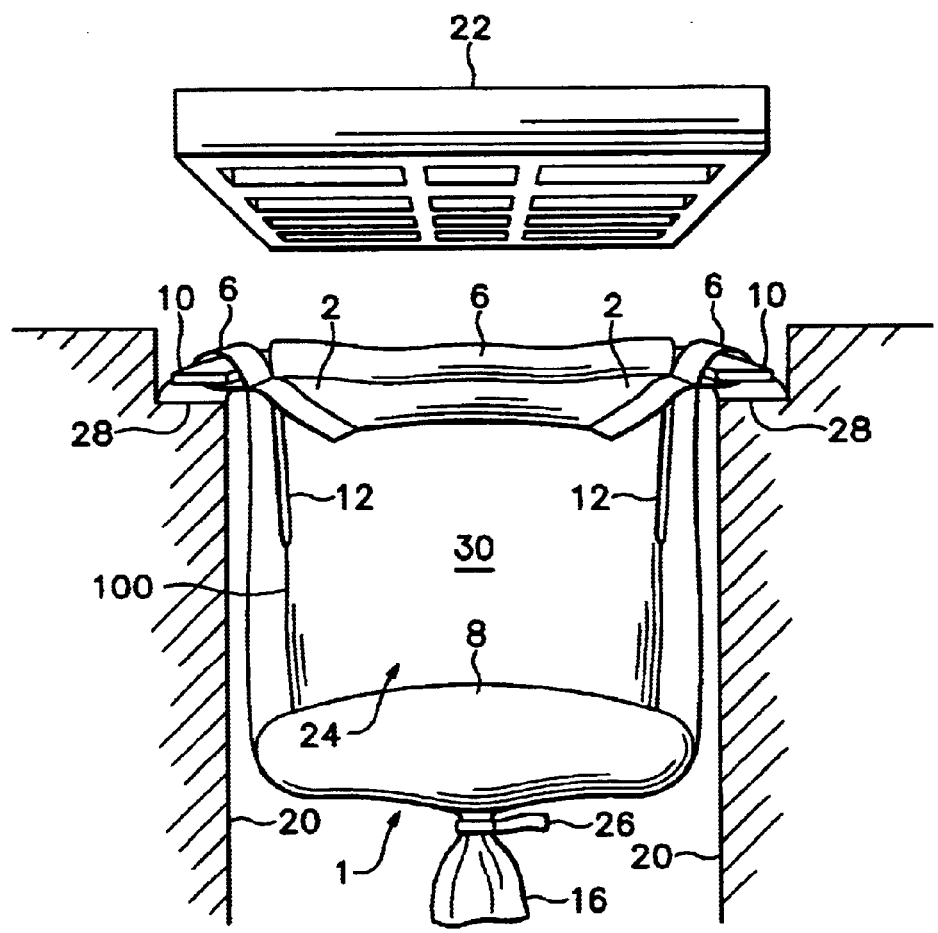
FIG. 1 is an exploded cross-sectional view of the components of a preferred embodiment of the invention for use in a rectangular drain basin.

Referring to FIG. 1, the present invention is a storm water drain basin insert 1 comprising a filter bag assembly 24 comprising a filter bag 100 and support members 10. Said filter bag 100 further comprises a bridge flap 2, overflow water bypasses 12, and support sleeves 6. Filter bag 100 is formed from a separated section of continuous roll 14. Additionally, a pollutant-absorbing pillow 8 may be provided.

Continuous roll 14 in one preferred embodiment is formed from a length of rectangular material such as cotton or burlap; the material having a top edge and bottom edge. The top edge of the material is folded over and restrained and secured a pre-selected location 60 to form support sleeve 6 and flap 2. Stitching means may be used to restrain and secured the folded over fabric at pre-selected location 60. The material is then rolled-up to provide for convenient handling, storage and preparation of basin inserts 24.

Filter Bag 100 is formed by cutting a single section from continuous roll 14, said section having a first vertical edge and a second vertical edge, a first horizontal edge 40 where sleeve 6 is located and a second horizontal edge 50 opposite said first edge, gathering the second horizontal edge together to form gathered-end 16, securing gathered-16 with securing means 26. Securing means 26 may include cinching the gathered-end with a cable tie or stapling the gathered end together with staples.

First vertical edge and the second vertical edges are then joined and affixed together at one corner of the drain basin. The joining of the vertical edges may be accomplished by stapling the edges together. An overflow bypass 12 may be provided by not stapling the entire lengths of the vertical edges together. Bypass 12 allows excess storm water to overflow into the corner of the drain basin 20.

Additional bypasses 12 may be provided by making incisions in filter bag assembly 24. Incisions can also be made in first horizontal edge 40 to provide access into sleeve 6 for support member 10 to be inserted therein. Support member 10 while inserted into sleeve 6 rest on drain basin cover support ledge 28, thereby suspending bag assembly 24 within drain basin 20. Suspending bag assembly 24 from all four edges inside drain basin 20 causes filter bag 100 to form a substantially rounded shape. In the preferred embodiment, additional bypasses 12 are located at the corners of the drain basin because the interstitial spaces between bag assembly 24 and the corners of the drain basin provide clearance for storm water to overflow.

Bridge flap 2 extends from sleeve 6 toward and into filter bag cavity 30. Bridge flap 2 channels storm water into the cavity 30 and onto pollutant absorbent pillow 8. Bridge flap 2, prevents unfiltered water from exiting through bypass 12.

The filter fabric 4 may be made of a porous material with hydraulic openings smaller than the pollutants intended to be filtered from the storm water. The filter fabric is preferably made from a polypropylene geotextile fabric or any other porous material such as, cotton, burlap, or stainless steel, fiberglass, or aluminum mesh.

Figure 4:
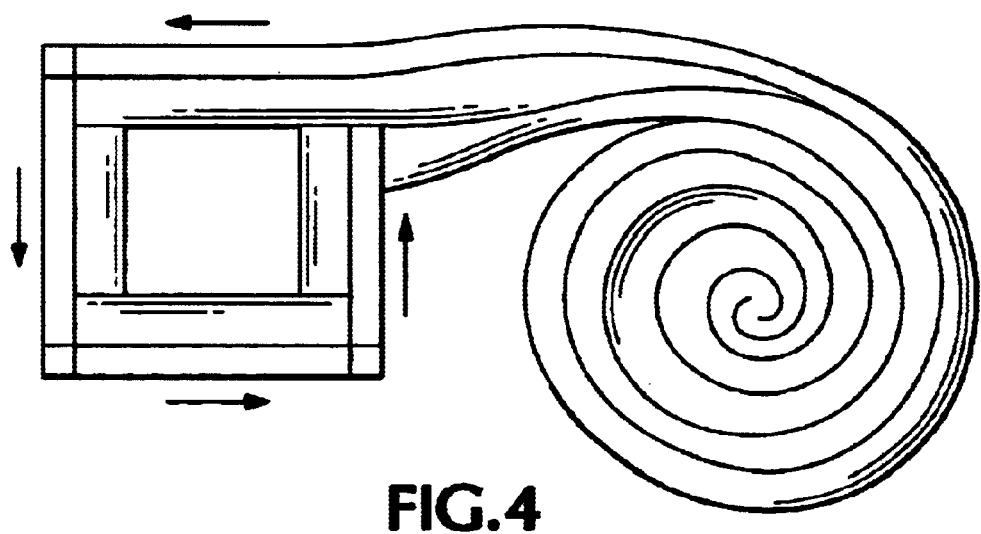
FIG. 4 is a top view of a component of an embodiment of the invention.

The elongated rigid support members may be made of angle irons, flat metal strips, plastic members, or wire. In the preferred embodiment the support members 10 are elongated bars. Support member 10 stretches sleeves 6 across inlet cover supports ledges 28. All the filter basket sides may be equipped with support bars inserted into sleeves. When assembled together, the bars rest on the cover support 28. The support ledges are typically about two inches wide. In the preferred embodiments of FIG. 1. and FIG. 4, the support bars are made of 16 gage galvanized sheet metal 1¾ inches wide and 1.2 cm (½ inch) shorter than the length of the ledge on which they rest. The support members rest flat on the inlet cover support 28 underneath the perforated cover 22 when cover 22 is in place. The length of the bars exceeds the distance between the walls lying perpendicular to the bars already in place. In rectangular basins where there are support ledges on only two sides of the basin, the two bars span between the ledges. Each bar supports opposite ends of the insert extending onto each of the two ledges. Where the support members require extra strength to span across the basin, 20 gage galvanized angle iron may be used. The angle iron is notched out 5 cm (2") on each end in order to be able to rest flat on top of the two parallel ledges. This angle iron also holds the alternate bars in place by hanging between the rods. The ends are placed on the ledges and in a corner of the basin. The flaps are joined by using staples in each corner. A pillow 8 is positioned by the bag assembly to absorb pollutants such as hydrocarbons. Pillow 8 may be comprised of many different kinds of hydrocarbon absorbent materials.

Figure 3:
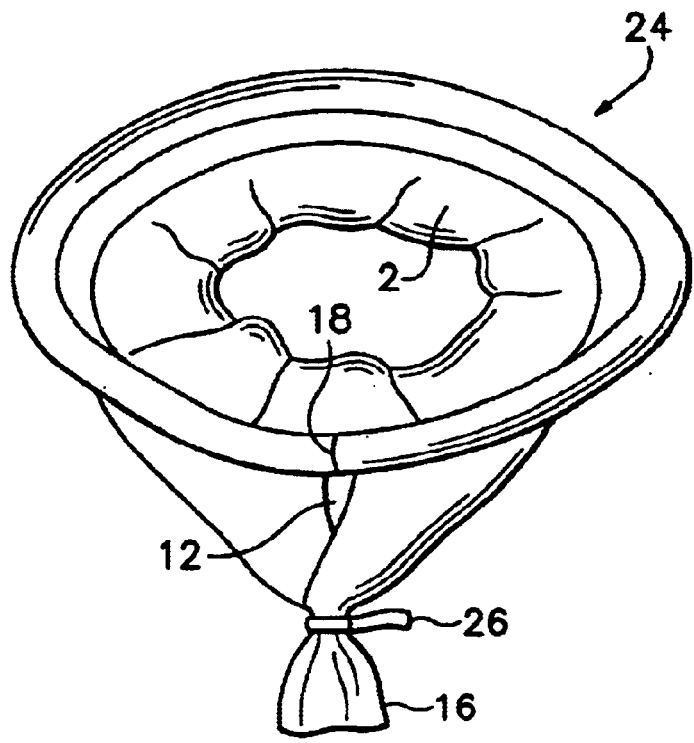
FIG. 3 is a perspective top view of another embodiment of the invention for use in a round drain basin.

In the round inlet basin design shown in FIG. 3 the support member may comprise a single piece of 14 gage 50–52-aluminum sheet metal. This is essentially resistant to both wear and corrosion. The perimeter of the support structure is circular in formation. The bar is disconnected at a separation 18. The bridge flap extends in a downward slope toward the cavity of the bag assembly thereby channeling water into the bag assembly cavity. A bypass 12 is provided in the upper section of the bag assembly 24 and underneath the bridge flap 2. The downward slant of the bridge is maintained by joining adjacent pieces of the flap 2 within the bag assembly. The flaps may be joined by using staples. A pillow 8 is positioned at the bottom of bag assembly cavity to absorb pollutants.

The invention disclosed removes and retains storm water pollutants within a storm water inlet basin 20. Storm water flows from the street through the perforated cover 22. Then it flows across sleeve 6, then across the bridge flap 2. The storm water then flows into the filter bag assembly 24 and into filter bag cavity 30. The assembly's filter material permits storm water to flow through the filter bag assembly and into the basin chamber while retaining pollutants within the bags' cavity. The support member is sandwiched between perforated cover 22 and cover support ledge 28. The support members bear the weight of the filter bag assembly 24 while preventing the deformation of the bag. In a rectangular inlet basin as shown in FIG. 1, the support members are longer than the basin opening directly below the cover ledge. The bars form angles at 90 degrees in the corners. The ends of the support bars extend onto the opposite two ledges of the basin. This extended length prevents the bars from slipping past the cover support and further down into the lower basin chamber. The bridge flap 2 covers the bypass openings 12, at the corners of the basin insert. In normal conditions, this prevents the storm water from prematurely dropping through the bypass openings 12. Drain basin invert 1 may be used to position a hydrocarbon absorbent pillow 8 in a storm water drain basin. Bypass opening 12 comprises a narrow slit in the filter fabric 4 of the filter basket opening. Bypass 12 allows excess water to overflow into the corners of the basin walls 20. In the event of filter failure, or during high water flows, it is necessary for water to escape unhindered out the bypass channels. Otherwise the water would back up into the street or parking lot and cause a traffic hazard. It is necessary that the pillow does not escape with the water out the bypass. Therefore, the bypass openings comprise slits smaller than the dimensions of the pillow.

The present invention is convenient to install. To install a rectangular insert, first measure the inside width and length of the basin opening. Then cut a length of continuous roll equal to twice this total measurement. Attach the two ends together forming a continuous loop. Leave the upper end of this attachment open to form a bypass. Then cut the three remaining corners of the filter basket through the sleeves and into the filter material as far as the width of the flap reaches. This opens the sleeves to receive the bars and at the same time cuts open the bypass openings. To form a closed bottom of the filter bag assembly 24, gather up the bottom edge of the filter fabric 4 into a bunch and tie it together with a slip tie 26 may be a cable tie. This forms gathered-end 16. Insert the four support members into the four sleeves. Next remove the perforated basin cover 22. Clean off the inlet cover supports ledges 28. Lay each support member, inserted inside its sleeve, onto the inlet cover supports ledges 28 in the inlet basin 20. Where there are only two parallel cover support ledges, instead of one continuous ledge, use flat support bars on these ledges. On the remaining two sides, use angle iron with the notched ears. Place them so that the ears rest in the corners on the first two bars. Place the lower half of this angle iron so that it hangs between the two bars. Let the gathered-end 16 drop into the basin and place the pillow inside the filter bag. Next staple the corners of the flap together. Now replace the basin cover 22. To remove the invention, merely lift the apparatus from the opened catch basin.

Figure 2:
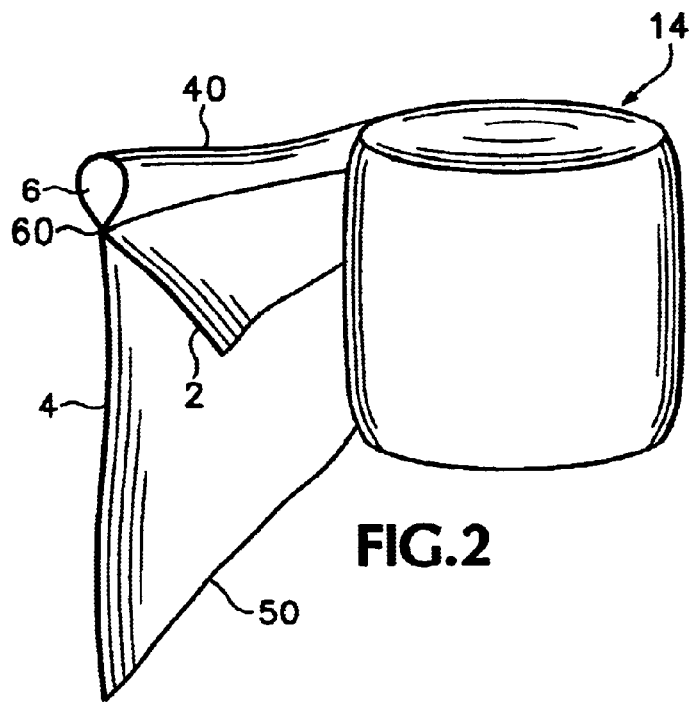
FIG. 2 is a perspective frontal view of a component of the embodiment shown in FIG. 1.

Installing the round design shown in FIG. 2 is also convenient. Beginning at the separation, insert the flat circular rod into one end of the sleeve 6 on the continuous insert roll. Slide the sleeve around until it meets the roll again and cut it off. Attach the bottom of the two ends leaving the upper portion of this attachment open to form a bypass opening 12. Cut three more bypass openings in the upper portion of the filter basket. To close the bottom of the filter basket, gather up the bottom edge of the filter fabric and tie it together in a bunch. This forms the tie gathered-end 16. Next open the catch basin. Clean off the inlet cover supports 28 and drop the apparatus onto them. Drop the pillow 8 inside the filter bag and replace the perforated basin cover 22. To remove the invention, merely lift the apparatus from the opened catch basin. Emptying the basin insert is also convenient. It can be either vacuumed or pulled out and emptied by hand.

Although the description above contains many specifications, these should not be construed as limiting the scope of the invention but as merely providing illustrations of some of the presently preferred embodiments of the invention. Thus the scope of the invention should be determined by the appended claims and their legal equivalents, rather than by the examples given.

What is claimed is:

1. A drain basin insert, located within a storm water inlet basin having a perforated cover that rests on a support ledge near the opening of said inlet basin, comprising:
   (a) a filter bag assembly, said filter bag assembly comprising a filter bag having an upper periphery, an open top, and a closed bottom, a support sleeve attached and located at said upper periphery, a flap portion attached and located below said support sleeve;
   (b) a support member located within said support sleeve; and
   (c) a water overflow bypass, said bypass comprising an opening formed in said filter bag assembly below said flap.

2. The drain basin insert of claim 1, wherein said water overflow bypass comprises a slit.

3. The drain basin insert of claim 1, wherein said filter bag assembly comprises a separated section of a continuous roll of filtering material and a tied bottom.

4. The drain basin insert of claim 3, wherein said filtering medium is selected from the group consisting of fabric, geotextile material, stainless steel, and aluminum.

5. The drain basin insert of claim 3, wherein said separated section comprises a face, a first vertical edge that is fastened to a second vertical edge, a first horizontal portion that is fastened and arranged to form said sleeve, a second horizontal portion that is tied together to form said closed bottom.

6. The drain basin insert of claim 5, further comprising a cable tie securing said second horizontal bottom forming said closed bottom.

7. The drain basin insert of claim 1, wherein said drain basin is of rectangular configuration, and wherein said bypass opening is substantially located at a corner of said drain basin, whereby water is able to flow out of said bag assembly at said opening.

8. A drain basin insert, located within a storm water inlet basin having a perforated cover that rests on a support ledge near the opening of said inlet basin, comprising:
   a) a filter basket assembly, said filter basket assembly comprising a section separated from a continuous roll of filtering medium and having a bottom closed with a tie; and
   b) a rigid support attached to said filter basket, wherein said filter basket is held into position within said inlet basin.

9. The drain basin insert of claim 8, wherein said continuous roll further comprises a sleeve located at an edge of said roll, whereby said rigid support cooperates with said sleeve to support said basin insert within said drain basin inlet.

10. The drain basin insert of claim 8, wherein said section of continuous roll further comprises a flap portion, said flap portion located substantially at a peripheral edge of the inlet of said drain basin whereby water is conducted into said basket assembly.

11. The drain basin insert of claim 8, wherein said basket assembly further comprises at least one bypass opening, said opening comprising a slit in said filter basket, whereby objects of pre-determined dimensions are retained within said basket assembly.

12. The drain basin insert of claim 11, wherein said bypass opening is located substantially near a corner of a rectangular drain catch basin.

13. A method for filtering debris and pollutants from water entering a storm drain basin having a perforated cover that rests on a support ledge within the top opening of said inlet basin comprising the acts of:
   a) separating from a continuous roll of filter medium a section, said section having a first vertical edge, a second vertical edge, a first horizontal portion, a second horizontal portion and a face;
   b) arranging and restraining said first horizontal portion to said face to form a forming a sleeve in said section;
   c) fastening said first vertical and said second vertical edges to each other;
   d) tying said second horizontal portion forming a closed bottom;
   e) inserting a substantially rigid support member into said sleeve;
   f) removing said perforated cover from said drain basin;
   g) positioning said closed bottom into said drain basin;

h) placing said sleeve, in which said support member is inserted into, on said cover support ledge;

i) placing said perforated cover on top of said sleeve.

14. The method of claim 13, wherein the act of arranging and restraining said first horizontal portion to said face to form a sleeve in said section, further comprises forming a flap with said top portion.

15. The method of claim 13, wherein the act of fastening said first vertical and said second vertical edges to each other, further comprises fastening said edges together for a predetermine length, whereby a bypass opening is created.

16. The method of claim 15, wherein said drain basin is of a rectangular configuration, further comprising the act of positioning said bypass opening substantially near a corner of said rectangular drain basin.

17. The method of claim 16, further comprising the step of making an incision into said section whereby another bypass opening is formed.

18. The method of claim 17, further comprising the step of making an incision into said section whereby a bypass opening located below said flap is formed.

19. The method of claim 13, further comprising the step of placing a pollutant absorbent pillow into said filter bag.

20. The method of claim 13, wherein the act of tying said second horizontal portion further comprises tying said second horizontal portion with a cable tie.

21. A method for filtering debris and pollutants from water entering a storm drain basin having a perforated cover that rests on a support ledge within the top opening of said inlet basin comprising the acts of:

a) providing a drain basin insert comprising a filter bag assembly having a open top periphery and a closed bottom, a support sleeve attached to said top periphery, a substantially rigid support member inserted into said support sleeve, said closed bottom comprising a tied bottom, wherein said filter bag assembly is formed from separating a section from a continuous roll of filtering material;

b) removing said perforated cover from said drain basin;

c) positioning said basin insert into said drain basin;

d) placing said sleeve, in which said support member is inserted into, on said cover support ledge; and e) placing said perforated cover on top of said sleeve.

22. The method of claim 21, wherein said filter bag assembly further comprises a bypass opening.

23. The method of claim 22, wherein said drain basin is of rectangular configuration, further comprising the step of arranging said bypass opening substantially near a corner of said drain basin.

* * * * *